United States Patent [19]
Preiser et al.

[11] 3,988,639
[45] Oct. 26, 1976

[54] LOW POWER SYNCHRONOUS MOTOR AND LINE CORD THEREFOR

[75] Inventors: Ralph H. Preiser, La Salle; Frank W. Stellwagen, Stamford, both of Conn.; Anthony W. Rigazio, Oglesby, Ill.

[73] Assignee: General Time Corporation, Thomaston, Conn.

[22] Filed: Sept. 5, 1975

[21] Appl. No.: 610,678

Related U.S. Application Data

[60] Continuation of Ser. No. 405,551, Oct. 11, 1973, abandoned, which is a division of Ser. No. 261,485, June 9, 1972, abandoned.

[52] U.S. Cl. ............................. 317/9 R; 307/92; 317/16; 317/257; 338/220; 339/147 P
[51] Int. Cl.² .......................................... H02H 3/00
[58] Field of Search ............... 307/62, 92, 100, 150, 307/156; 338/219, 220, 226; 317/9, 16, 17, 20, 257; 323/1, 7, 9, 93, 94 R, 63, 79; 310/40 MM, 68 A, 72; 174/5 R, 5 B, 56; 339/147 R, 147 C, 147 P

[56] References Cited
UNITED STATES PATENTS

| | | |
|---|---|---|
| 641,076 | 1/1900 | Carter ............................ 338/220 X |
| 1,949,996 | 3/1934 | Fleming ......................... 339/147 P X |
| 2,259,359 | 10/1941 | Thompson ..................... 310/72 UX |

*Primary Examiner*—Harry Moose
*Attorney, Agent, or Firm*—Pennie & Edmonds

[57] ABSTRACT

A low power synchronous motor is disclosed having a rotor including a pair of rotor discs between which is sandwiched a permanent magnet which is polarized such that one of the rotor discs is a north pole and the other is a south pole. The stator includes an energizing winding having a core passing therethrough. A pair of complementary stator plates are secured at each end of the energizing winding to the core and are bent at right angles to form a copolanar stator air gap portion. The coplanar portion of the stator has a notched, circular air gap into which the rotor is positioned. The flat stator plates provide for easy assembly of the motor in a clock movement. The electrical energy coupled to the energizing winding is attenuated by means of a pair of impedance elements connected in series with the energizing winding and situated in the plug of the energizing circuit. The impedance elements reduce the current flow into the clock and hence prevent the possibility of a hazardous shock to someone coming in contact with an exposed wire.

4 Claims, 7 Drawing Figures

LOW POWER SYNCHRONOUS MOTOR AND LINE CORD THEREFOR

This is a continuation of application Ser. No. 405,551 filed Oct. 11, 1973, now abandoned, which, in turn, is a division of application Ser. No. 261,485, filed June 9, 1972, and now abandoned.

BACKGROUND OF THE INVENTION

This invention relates to an inexpensive, low power synchronous inductor motor and, in particular, to a low power synchronous inductor motor for driving a clock movement.

In the past there have been two general types of synchronous motors used in the industry to drive electric clock movements, namely, the hysteresis motor and the inductor motor. The earliest electriclclock movements turned out in great volume employed a 3600 rpm hysteresis motor. The two stator poles of this motor were split to accommodate large copper shading rings which caused the pulsating magnetic field provided by the stator energizing winding to be converted to a rotating field which is required for unidirectional and self-starting rotation of the rotor. The high rotor speed required a special finish on the shaft and bearings of the motor and on the gear train. Further, precision cutting of the gear train components, complete encapsulation of the rotor and gear train and careful attention to the internal lubrication of the rotor and gear train was required. With each of the aforementioned prerequistes, the motor was still subject to a short life and was inherently noisy.

Later another clock movement manufactured in great volume used a 900 rpm, 8 pole hysteresis motor. Because of the low rotor speed, the movement was quieter and had a longer life than the aforementioned high speed design. However, this movement also required an encapsulated rotor and gear train and in addition required elaborate precautions regarding the lubrication and the quality of parts.

Another prior art motor produced in great volume was an inductor motor that had a rotor which rotated at 200 rpm. The rotor structure was made up of a permanent magnet disc with the outer peripheral edges of the disc magnetized alternately with north and south poles. With this arrangement the flux generated by the stator winding passed through the high reluctance path of the permanent magnet thereby causing substantial power and heating loses in the rotor.

Generally, prior art clock motors operated at a developed torque which was substantially more than required to rotate the hands of a clock. Typically, these motors dissipated two watts of power with a temperature rise in the motor of approximately 40° C. In view of the prior art motor designs, it is an object of this invention to provide a low power synchronous motor designed to operate at a fraction of the developed torque provided by prior art motors and, in addition, to reduce substantially the current flow into the energizing winding thereby rendering the motor safe in case of accidental contact with the electrical circuit which energizes the stator windings. Further, because of the reduced power requirements, the temperature rise in the motor is reduced thereby permitting greater durability of the various motor parts.

Another object of this invention is to provide a highly efficient motor having a motor structure capable of being easily assembled by means of assembly line techniques.

SHORT STATEMENT OF THE INVENTION

Accordingly, this invention relates to a synchronous induction motor having an energizing winding sandwiched between a pair of complementary stator plates. A core is passed through the energizing winding and is magnetically and structurally secured to the stator plates. Each of the stator plates are bent at right angles to form a coplanar portion having a notched, generally circular air gap in which a rotor rotates. The rotor includes a permanent magnet sandwiched between a pair of discs. The discs are notched to form a plurality of rotor poles which interact with a like number of stator poles formed by the notched stator to drive the rotor at synchronous speed.

A pair of impedance elements such as capacitors or resistors are inserted in a plug which conveys electrical energy to the stator winding; the impedance elements each being connected in series with the energizing winding to limit the flow of current to the motor thereby reducing the power dissipation in the motor and eliminating any possibility of shock to a person coming in contact with the motor or directly with the wires.

BRIEF DESCRIPTION OF THE DRAWINGS

Other objects, advantages, and features of this invention will become more fully apparent from the following detailed description, appended claims and the accompanying drawings in which:

DETAILED DESCRIPTION OF THE PREFERRED EMBODIMENT

In order to achieve greater product safety and reliability in a clock, the clock and the cord for conveying electrical energy thereto should not utilize more than 5 milliamperes of current. This current level is generally accepted as the level below which the current is considered non-hazardous to human life. The total ground resistance of the human body including the contact resistance between the body and the circuit element, the body resistance, and the resistance between the body and ground is generally considered to be 500 ohms when the body is wet and 1500 ohms when the body is dry. Most electrical clocks on the market which are energized from a standard wall outlet at a voltage of 120 volts AC utilize approximately 50 milliamperes of current which is substantially above the safety level of 5 milliamperes. Thus, if someone were to make contact with an electrical circuit in a clock or to accidentally cut through the cord of a clock using 50 ma, a serious possibility of bodily harm would result. This problem is solved by the plug and cord design shown in FIGS. 1–4.

Figure 1:
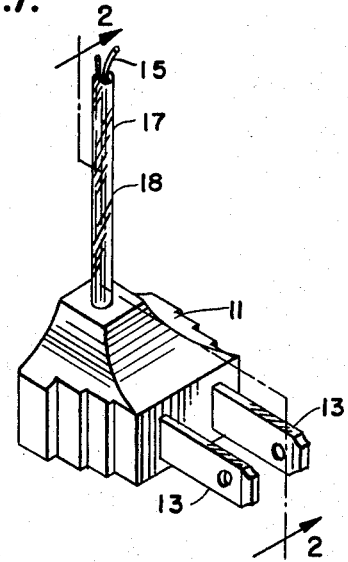
FIG. 1 is a perspective view of the plug associated with the energizing circuit of the motor of this invention.

Referring to FIG. 1 there is shown a plug 11 made of a suitable, commonly available plastic or rubber insulating material. A pair of male prongs 13 extend outwardly from the plug for insertion into a wall electrical outlet. The lead wires 15 of the cord 17 extend from the plug at a right angle thereto. The lead wires are set in a thin insulator 18. As will be more fully understood from the ensuing disclosure, the conductors 15 can be much smaller than the usual wires in cords for operating clocks. Preferably the insulator 18 is flat and has a pressure sensitive adhesive on one side thereof so that the cord formed by the conductor and insulator can be secured to a wall or floor. The cord is of micro-size and may be between 10 and 20 thousandths of an inch thick and between ⅛ and ¼ of an inch wide. The cord is about 1/16 the size of conventional line cords.

Figure 2:
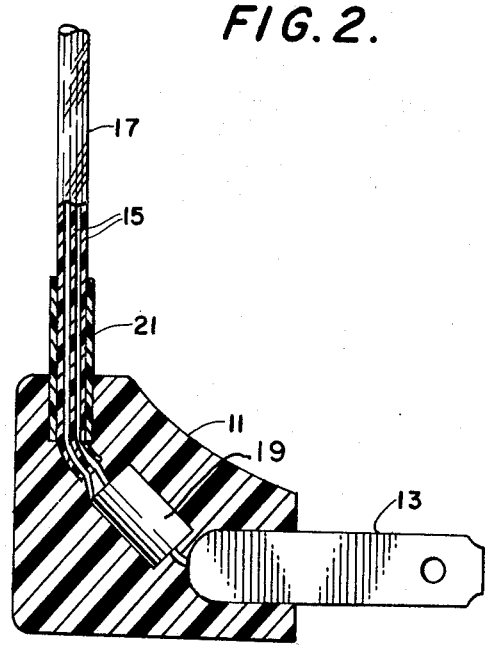
FIG. 2 is a cut away view taken along the lines 2—2 of FIG. 1 and shows an impedance element positioned in the plug.

Referring to FIG. 2 there is shown a cross section view of the plug of FIG. 1 taken along the lines 2—2 thereof. Prong 13 is shown embedded in plug 11 with a resistive element 19 connected thereto. The other end of the resistor 19 is secured to one conductor 15 of the cord 17. A protective sheath 21 is shown positioned about the cord 17 to prevent rupture of the cord 17 where the cord meets the plug 11. A second resistive element (not shown) is connected to the other male prong at one end and to the other wire 15 of the cord 17 at the other end. It should be understood that while a resistive element is shown, a capacitor or inductor could also be used in accordance with the present invention. While the resistors in the plug will dissipate electrical energy, the plug will not become hot since the prongs 13 which make contact with the relatively large conductors in the wall outlet, act as a heat sink. Thus the temperature of the plug remains close to ambient temperature.

Figure 3:
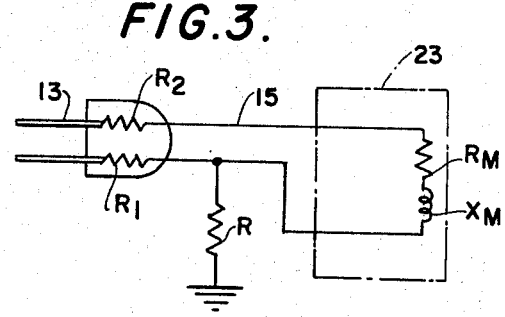
FIG. 3 is a schematic diagram of the motor and plug of this invention with a pair of resistance elements in the plug.

Refer now to FIG. 3 for a brief explanation of how the low power plug and cord arrangement operates in combination with a clock motor. Assume, for example, that a person has made direct contact with one of the leads 15 which convey electrical power from the wall outlet to a clock which is illustrated schematically by block 23. If the person is in a dry body location, the resistance R which his body presents to the circuit will typically be the established value of 1500 ohms. With 120 volts across the prongs 13, the total current that will flow through the circuit will be given by the following formula:

$$I = \frac{120}{R_1 + R} = .005 \text{ amperes}$$

where $R_1$ is the resistance connected to one conductor in the plug and 0.005 amperes is the maximum current which, as a general rule, will not harm a person making contact with the circuit. Solving the equation, $R_1$ is found to be 22,500 ohms. Since the same ground condition could occur on the other line, the resistance $R_2$ should be of equal value with the resistance $R_1$. If a short circuit should occur between the two conductors 15, the total current flow through the circuit is given by the following formula:

$$I = \frac{120}{R_1 + R_2} = \frac{120}{22,500 + 22,500} = .00267 \text{ amperes}$$

It therefore can be seen that under ground or short circuit conditions no more than 5 milliamperes will pass through the electrical circuit thereby rendering the circuit completely safe to anyone making direct electrical contact therewith.

Under normal operation, the current flow through the clock is given by the following formula:

$$I = \frac{120}{\sqrt{(R_1 + R_2 + R_m)^2 + (X_m)^2}}$$

where $R_m$ and $X_m$ are the resistance and inductive reactance of the energizing winding of the motor of the clock. Using a 10,000 turn coil of AWG No. 43 wire, the resistance $R_m$ can be shown to be 4,400 ohms and the inductive reactance can be shown to be 4,600 ohms. It therefore can be seen that the current flowing through the energizing winding will be 2.44 milliamperes. With such levels of current, the line cord 15 can be made very small thereby making it possible to use a transparent insulator for the cord 17 which because of the small size of the wire is not easily seen by the human eye. As aforementioned, while the resistors will absorb energy, they will not get hot because of the low wattage being dissipated therein and because the prongs 13 are connected directly to a relatively large conductor in the wall outlet. Since electrical conductors are also good heat conductors, the prong and wall outlet combine to form an ideal heat sink.

Figure 4:
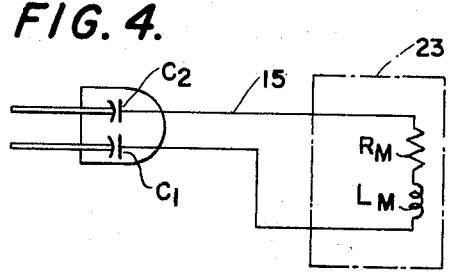
FIG. 4 is a schematic diagram of the energizing circuit for the motor of this invention having a pair of capacitors in the plug.

Refer now to FIG. 4 where there is shown a schematic diagram of an alternate embodiment of the present invention. A pair of capacitors C1 and C2 positioned in the plug are serially connected to the conductors 15 which convey current to the energizing winding of the clock motor which is represented by block 23. Applying the circuit equations, it can be found that if current flow to ground is limited to 5 milliamperes, the current flow in the case of a short circuit between wires 15 will be 2.5 milliamperes. Further, if the energizing winding has 10,000 turns of AWG No. 43 wire, the total current flow through the motor will be 2.7 milliamperes. In the case of 14,500 turns of AWG No. 43 wire, the inductance is increased and accordingly the sum of the circuit reactance is reduced. With the total circuit reactance reduced, the current flow through the energizing winding will increase to 3.1 ma. It can therefore be seen that by a suitable combination of capacitor values in the plug and inductance values in the energizing winding, the amount of current passing through the motor can be increased while holding the current under short circuit or ground conditions to less than 5 milliamperes.

Figure 5:
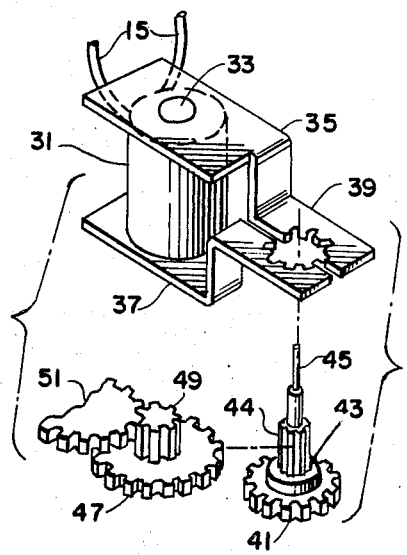
FIG. 5 is an exploded perspective illustration of the motor of this invention.

Refer now to FIG. 5 where there is shown the synchronous inductor motor of this invention. The energizing winding 31 is shown having a pair of leads 15 connected thereto. The winding is wrapped about a bobbin (not shown) through which is positioned a ferromagnetic core 33. A pair of complementary stator plates 35 and 37 are positioned at each end of the energizing winding 31 in mechanical and electromagnetic contact with core 33. The plates may be secured to the core by any one of a number of suitable techniques known in the art. The stator plates extend from the stator winding parallel to each other and are bent at right angles to form a coplanar stator portion 39. A notched semi-circular air gap is formed in each stator plate in coplanar portion 39 so as to define a circular air gap into which a rotor 41 may be positioned. The notched portion of the air gap forms a plurality of equally spaced stator poles.

A rotor 41 is shown mounted on a plastic collar 43 having a rotor pinion 44 formed intergal therewith at one end thereof. A metal spindle 45 is passed through the collar of the rotor. The manner in which the rotor is positioned in the air gap will be more fully described in connection with FIG. 7. A first reduction wheel 47 is shown spaced from pinion 44 but which when assembled in the clock meshes with pinion 44. Formed integral with wheel 47 is a drive pinion 49 for driving a second reduction wheel 51.

Figure 6:
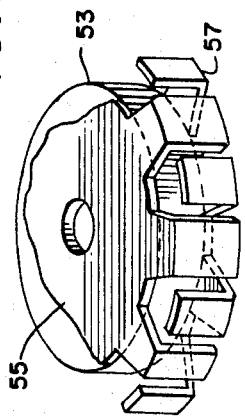
FIG. 6 is a partial perspective view of the rotor associated with the motor of this invention.

The rotor construction is described in greater detail in connection with FIG. 6. A permanent magnet 53 in the form of a disc is shown sandwiched between a pair of rotor discs 55 and 57. The permanent magnet consists of a barium ferrite powder supported in a suitable binder material. The outer periphery of the discs 55 and 57 are cut in the form of a plurality of tabs or teeth which are bent inwardly at right angles to the plane of the discs. The discs are secured to the permanent magnet disc 53 by a suitable means so that the tabs or teeth of the upper disc 55 interleave with the teeth of the bottom disc 57.

The magnetic flux created by the permanent magnet has an additive effect tending to increase the flux density in the working gap. Since the motor torque is approximately proportional to the square of the flux density in the air gap, it can be seen that the motor torque will be increased by the rotor construction of this invention. Further, with the exception of the working air gap between the stator and rotor the motor structure is arranged so that the generated magnetic flux from the energizing coil passes only through materials having high permeability. The energizing flux does not pass through the permanent magnet which would otherwise cause substantial attenuation of the energizing flux due to the usual high reluctance of permanent magnet materials. Thus, while the permanent magnet adds to the total flux in the air gap, the high reluctance path presented thereby is circumvented by the rotor discs 55 and 57.

Other advantages of the rotor of this configuration are more fully described in U.S. Pat. No. 3,469,131 issued to F. W. Stellwagen which patent is assigned to the common assignee herewith. The complete motor because of its simplicity is less costly than prior art motors and can be easily assembled by rapid assembly line techniques particularly when it is being mounted in a utilization device such as a clock. Further, since the motor has a large number of poles, it can operate at relatively low rotational speeds, eg. 240 rpm, thereby reducing the need for elaborate lubrication and other maintainance procedures.

Figure 7:
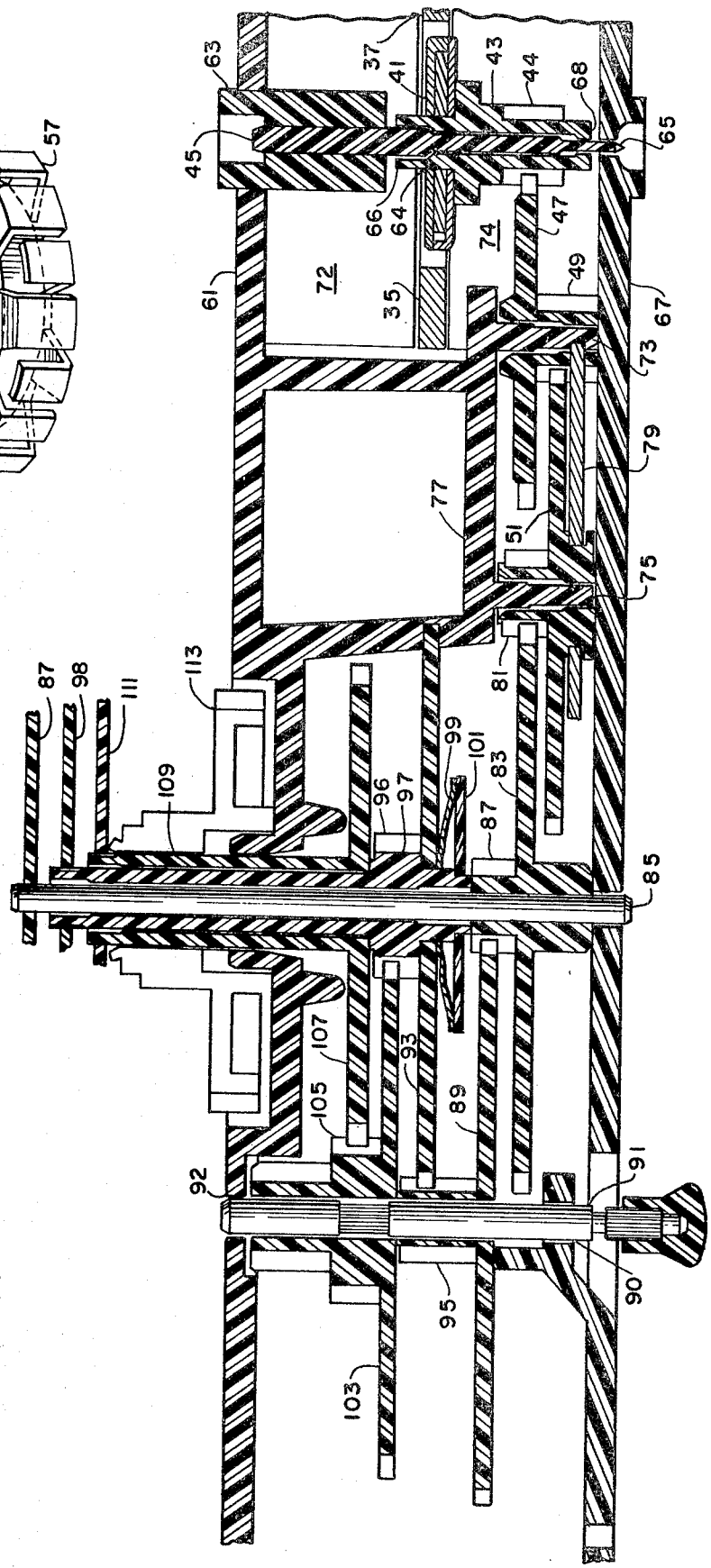
FIG. 7 is a section view of the motor of this invention in position for driving a clock movement.

Refer now to FIG. 7 where there is shown a section view of the clock movement of this invention. Secured to front plate 61 is a spindle support element or post 63. The spindle support element 63 may be formed integral with the front plate or may be a separate part as shown in FIG. 7. One end of a rotor spindle 45 is positioned in the spindle support element such that the other end extends into a hole 65 in a back plate 67. The spindle has three different diameters which are provided to simplify assembly, reduce friction and reduce noise. The junction 64 between the largest diameter portion of the spindle and the intermediate diameter portion thereof is formed in the shape of a truncated cone. This surface, as will be seen, is the bearing surface for rotation of rotor collar 43 about the spindle. As shown the rotor collar 43 which consists of a low friction plastic material is positioned over the spindle from the back plate side of the clock. The rotor 41 which is secured to the rotor collar 43 by a suitable bonding compound is displaced downwardly from the stator plates 37 and 39. The internal hole of the rotor collar 43 has a cone shaped bearing surface 66 which when the motor is energized is forced against the complementary cone shaped portion 64 of the metal spindle. By having the magnetic flux of the motor force the rotor collar against the spindle, the total surface contact between the metal spindle and the collar is reduced, and, in addition, the eccentricity is reduced thereby reducing the noise level of the motor. The hole at the lower end 68 of the collar 43 has a reduced diameter to provide a second bearing surface so that the effect of moments generated by the interaction of the pinion 44 of the rotor collar and the first reduction gear 47 are minimized.

Stator plate 35 is shown positioned to one side of the rotor 41 stator plate 37 positioned to the other side thereof. The stator plate 37 is ultrasonically welded onto the front plate 61. This permits the stator to be accurately positioned about the rotor shaft in order to provide a uniform air gap and minimize concentricity error. As shown walls 72 and 74 formed integral with front and back plates 61 and 67, respectively, support the coplanar portion of the stator plates.

The collar pinion 44 drives a first reduction gear 47. The pinion 49 of the first reduction gear 47 drives a second reduction gear 51. The first and second reduction gears are secured in place by means of a pair of posts 73 and 75 respectively, which are formed intergal with an anchor 77. Anchor 77 in turn is formed integral with front plate 61. The posts 73 and 75 each have enlarged diameter portions near their respective bases while the gears 47 and 51 each have reduced diameter holes near the back plate 67. This construction minimizes the bearing surface between the respective gears and posts thereby reducing the friction therebetween.

A "no back" 79 is provided which insures the rotation of first reduction gear 47 in the proper direction. If the rotor initially rotates in the "wrong direction", the "no back" will spring gear 47 in the opposite direction and thereby cause desired rotation of rotor 41. "No backs" are known in the art, and accordingly the "no back" shown herein is not illustrated in great detail.

The pinion 81 of the second reduction gear 51 drives the seconds wheel 83. The seconds wheel is fixedly secured to the seconds shaft 85 which extends through the front plate 61 to the front of the clock. A seconds hand 87 is secured to the seconds wheel. The pinion 87 of seconds wheel 83 drives an intermediate gear wheel 89, which wheel is rigidly secured to a set shaft 91. The set shaft 91 is rotatably positioned in the clock movement through holes 90 and 92 in the back and front plates, respectively. The set shaft serves to set the minute and hour hands of the clock movement in a manner well known.

A minutes wheel 93 is driven by the pinion 95 of the intermediate gear wheel 89. The minutes wheel is fixedly secured to the minutes shaft 97 which is telescoped over the seconds shaft 85. A minutes hand 98 is secured to the portion of the minutes shaft extending in front of plate 61.

A friction spring 99 is positioned over a washer 101 between the washer and the minutes wheel. The friction spring provides friction for the minutes and hour wheel so that the hour and minute hands can be manually set without rotating the entire gear trains, as is well known in the clock art. The pinion of minutes shaft 97 drives a motion wheel 103 which is rotatably positioned on set shaft 91. The pinion 105 of motion wheel 103 drives an hour wheel 107 which is integrally formed with the hour shaft 109. The hour shaft 109 is telescoped over the minutes shaft 97 as shown in the Figure. Connected to the end of the hour shaft is an hour hand 111. A portion of an alarm set mechanism 113 is shown positioned over the hour drive shaft 109. Since the alarm set mechanism is not a part of the present invention, it is not disclosed in detail herein. Because the clock movement is made of a low friction plastic material, no lubrication is required between the various telescoped shafts which drive the seconds, minutes and hour hands thereby simplifying the maintance of the clock movement.

Since the entire clock movement structure aside from the motor and spindle are made of plastic materials, the clock can be easily and economically manufactured because the parts can be molded and formed in fewer steps and with fewer parts than formerly required in metal clocks. Further, since low friction plastic is a self-lubricating material, special care does not have to be taken to provide for lubricating the various moving parts of the clock.

In operation with a 60 Hz line input, the rotor assembly rotates at a speed of 240 rpm. The pinion teeth 44 of the rotor collar which engage the teeth of first reduction gear 47 provide a speed reduction of 5:1 so that the first reduction gear 47 rotates at 48 rpm. The pinion teeth 49 of the first reduction gear which engage the teeth of the second reduction gear 51 provide an additional speed reduction of 6:1. Hence, reduction gear 51 rotates at 8 rpm. The pinion teeth 81 of the second reduction gear which engage the teeth of the seconds wheel 83 provide a further speed reduction of 8:1 thereby driving the seconds wheel 83 at 1 rpm. The pinion teeth 87 of the seconds wheel drive the intermediate gear 89 at 8 rph and the pinion teeth of the intermediate gear rotate the minutes gear 93 at 1 rph. The motion gear 103 is driven by the pinion 96 of the minutes wheel at ¼ rph and the pinion 105 of the motion wheel drives the hour gear at 1/12 rph.

While the invention has been described in connection with a preferred embodiment, it is not intended to limit the invention to the particular form set forth, but, on the contrary, it is intended to cover such alternatives, modifications and equivalents as may be included within the spirit and scope of the invention as defined by the appended claims.

What is claimed is:
1. An electrical connector for conveying current to an apparatus comprising:
    a. a plug, said plug including
        1. at least two prong means, each prong means having a pair of ends with one end received by said plug and the other end extending from said plug, said other end of said prong means adapted for electrical connection to a source of current;
    b. an electrical cord, said electrical cord including
        1. at least two conductors therein, and means for insulating each of said conductors from each other conductor; and,
    c. impedance means carried within said plug, said impedance means connecting each prong means to an individual one of said conductors thereby to limit said conveyed current through said electrical connector to a non-hazardous level of no more than about 5 milliamperes.
2. The electrical connector according to claim 1 wherein:
    a. said impedance means includes a resistor in series connection with individual conductors.
3. The electrical connector according to claim 1 wherein:
    a. said impedance means includes a capacitor in series connection with individual conductors.
4. The electrical connector according to claim 1 wherein:
    a. said electrical cord is a mirco-size dimension of less than about 0.020 inches in thickness and less than about 0.25 inches in width.

* * * * *